US010572261B2

(12) United States Patent
Robertson et al.

(10) Patent No.: US 10,572,261 B2
(45) Date of Patent: Feb. 25, 2020

(54) PROVIDING TASK-TRIGGERED DETERMINISTIC OPERATIONAL MODE FOR SIMULTANEOUS MULTI-THREADED SUPERSCALAR PROCESSOR

(71) Applicants: Alistair Paul Robertson, Glasgow (GB); James Andrew Collier Scobie, Helensburgh (GB)

(72) Inventors: Alistair Paul Robertson, Glasgow (GB); James Andrew Collier Scobie, Helensburgh (GB)

(73) Assignee: NXP USA, Inc., Austin, TX (US)

( * ) Notice: Subject to any disclaimer, the term of this patent is extended or adjusted under 35 U.S.C. 154(b) by 238 days.

(21) Appl. No.: 14/988,964

(22) Filed: Jan. 6, 2016

(65) Prior Publication Data
US 2017/0192790 A1    Jul. 6, 2017

(51) Int. Cl.
*G06F 9/38*     (2018.01)
*G06F 9/30*     (2018.01)

(52) U.S. Cl.
CPC .......... *G06F 9/3836* (2013.01); *G06F 9/3009* (2013.01); *G06F 9/3851* (2013.01)

(58) Field of Classification Search
None
See application file for complete search history.

(56) References Cited

U.S. PATENT DOCUMENTS

| | | | | |
|---|---|---|---|---|
| 6,854,051 B2* | 2/2005 | Mukherjee | .......... | G06F 11/1405 712/202 |
| 7,734,833 B2* | 6/2010 | McKenney | .......... | G06F 9/4887 710/15 |
| 10,091,312 B1* | 10/2018 | Khanwalkar | .......... | H04L 67/22 |
| 2006/0101238 A1* | 5/2006 | Bose | .................... | G06F 9/3802 712/206 |
| 2007/0204137 A1* | 8/2007 | Tran | .................... | G06F 9/30181 712/214 |
| 2008/0282067 A1* | 11/2008 | Ozer | .................... | G06F 9/3851 712/214 |
| 2012/0254882 A1* | 10/2012 | Makljenovic | ......... | G06F 9/5011 718/103 |

OTHER PUBLICATIONS

Reineke et al. (A Definition and Classification of Timing Anomalies, 2006, pp. 1-6) (Year: 2006).*
Thiele et al. (Design for Timing Predictability, 2004, pp. 157-177) (Year: 2004).*
Wang et al. (Variation-aware Task Allocation and Scheduling for MPSoC, 2007, pp. 598-603) (Year: 2007).*

(Continued)

*Primary Examiner* — George Giroux

(57) ABSTRACT

A task identifier-based mechanism is configured to temporarily disable a dual-issue capability of one or more threads in a superscalar simultaneous multi-threaded core. The core executes a first thread and a second thread which are each provided with a dual-issue capability wherein up to two instructions may be issued in parallel. In response to a task identifier being received that is indicative of a task requiring an improved level of determinism, the dual-issue capability of at least one of the first thread or the second thread is temporarily disabled.

22 Claims, 3 Drawing Sheets

(56) References Cited

OTHER PUBLICATIONS

ARM, Cortex-A7 MPCore, Technical Reference Manual, whole document, 2011-2013.
Deterministic Algorithm. Wikipedia. http://en.wikipedia.org/wiki/Deterministic_algorithm, pp. 1-3, believed to be available publicly at least as early as Dec. 8, 2015.
Simultaneous Multithreading. Wikipedia. http://en.wikipedia.org/wiki/Simultaneous_multithreading, pp. 1-5, believed to be available publicly at least as early as Dec. 8, 2015.
Central Processing Unit. Wikipedia. http://en.wikipedia.org/wiki/Central_processing_unit, pp. 1-15, believed to be available publicly at least as early as Dec. 8, 2015.

* cited by examiner

PROVIDING TASK-TRIGGERED DETERMINISTIC OPERATIONAL MODE FOR SIMULTANEOUS MULTI-THREADED SUPERSCALAR PROCESSOR

FIELD OF THE DISCLOSURE

The present disclosure relates to computer processors and, more particularly, to methods, apparatuses, and computer program products for providing a task-triggered mode of operation with improved deterministic execution in a simultaneous multi-threaded (SMT) superscalar processor.

BACKGROUND OF THE DISCLOSURE

A superscalar SMT processor implements instruction-level parallelism within a single processor. More than one instruction may be executed during a clock cycle by simultaneously dispatching multiple instructions to different functional units on the processor. Each functional unit is not a separate processor core, but rather an execution resource within the processor, such as an arithmetic logic unit (ALU), a bit shifter, or a multiplier.

The overall efficiency of the superscalar processor may be improved through the use of an SMT core that permits a plurality of independent threads or processes to be executed simultaneously on a single processor core. The SMT core also permits simultaneous execution of multiple tasks on the single processor core with different Page tables, different Task state segments, different protection rings and different Input/Output (I/O) permissions for each of the tasks. The SMT may include one or more microprocessors operatively coupled to one or more memory management units. Depending upon the specific details of implementation for the microprocessor and the memory management unit, the features of different protection rings and different I/O permissions may or may not be provided. On a fundamental level, one may expect different tasks to be using different resources as the same time, but a guarding mechanism may not always be enforced. The SMT core is supported by an operating system that includes software for implementing one or more functions to be performed by the superscalar processor, such as scheduling tasks, executing applications, controlling peripherals, managing data storage, and controlling communication resources.

A real-time processor is required to operate in a deterministic manner. When a task is executed more than once, or on multiple occasions, there should be a minimal variation in the execution time of the task. The task may also have a real time deadline, which must be met and therefore may require higher levels of determinism to provide more predictable execution time. Many operating systems specify task-level timing protection. This requires a user to specify a maximum permissible duration of time for execution of a task. Tasks not completed within the permissible duration of time trigger an alarm. If a task-timing protection scheme is to operate successfully, the specified duration of time for the task should exceed the actual execution time by a minimal amount. When the operating system provides a significant amount of inherent indeterminism, it is very difficult to provide an appropriate time budget for task execution.

SMT cores are typically targeted at non-real-time applications. More recently, SMT cores have been introduced to real-time applications as a potential solution to manage the performance-to-power ratio of the processor. However, the introduction of SMT cores into real-time applications is often perceived as adding an additional degree of undesired indeterminism to task execution. This indeterminism is caused by the sharing of resources within the SMT core between two or more threads. The degree of dual-issue capabilities of a first thread may be heavily influenced by the activity of a second thread and the second thread's use of processor resources.

For at least these reasons, therefore, it would be advantageous if new or improved systems and methods for providing a task-triggered deterministic operational mode for the SMT core could be achieved that address one or more of the previously-discussed limitations or other limitations.

DETAILED DESCRIPTION

Apparatuses, methods, and systems provide a task identifier-based mechanism configured to temporarily disable a dual-issue capability of one or more threads in a superscalar simultaneous multi-threaded core. The simultaneous multi-threaded core executes a first thread and a second thread. SMT cores can support more than two threads, but for purposes of illustration, a dual threaded implementation will be presented. Any of the various embodiments described herein may be applied to an SMT core supporting N threads of simultaneous execution, where N is a positive integer greater than one. The first thread and the second thread are each provided with a dual-issue capability wherein up to two instructions may be issued in parallel. In response to a task identifier being received that is indicative of a task for which an improved level of determinism is to be provided, the dual-issue capability of at least one of the first thread or the second thread is temporarily disabled.

Many computers can only execute one program instruction at a time. However, superscalar cores and SMT cores can execute more than one program instruction at the same time. These Superscalar cores and SMT cores are said to exhibit instruction level parallelism. Additionally, in embodiments according to the invention, an SMT core will also exhibit thread level parallelism. In the field of computer programming, a thread is defined as a sequence of code and its context used to execute a defined sequence of operations. The threads are both complimentary, with the results of one thread being used by other threads, or exclusive with no functional interaction between threads. From the program's point of view, a thread can be dynamically scheduled to execute on any of the SMT execution paths, or can be assigned to a specific one or subset of its N execution paths. An operating system may save the contents of the register when the program is interrupted, and then restore the contents of the register when the operating system gives the program control again.

Figure 1:
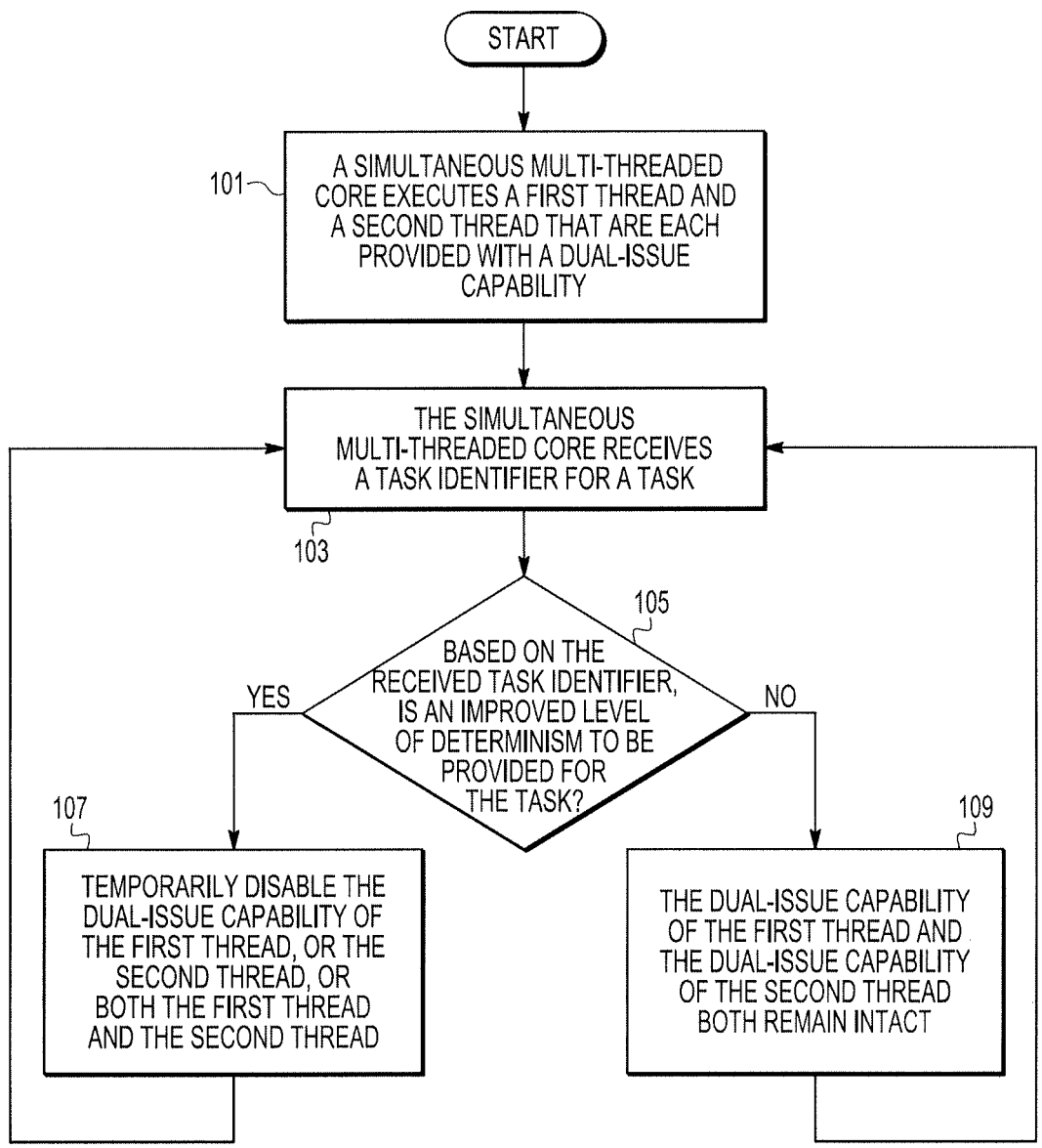
FIG. 1 is a flowchart showing an illustrative operational sequence configured according to a set of exemplary embodiments for using a simultaneous multi-threaded superscalar processor to provide a task-triggered deterministic operational mode.

FIG. 1 is a flowchart showing an illustrative operational sequence configured according to a set of exemplary embodiments for using a simultaneous multi-threaded superscalar processor to provide a task-triggered deterministic operational mode. The operational sequence commences at block 101 where a simultaneous multi-threaded core executes a first thread and a second thread. The first thread and the second thread are each provided with a dual-issue capability wherein up to two instructions may be issued in parallel. Next, at block 103, the simultaneous multi-threaded core receives a task identifier for a task. The task is associated with instructions form a plurality of program threads. Alternatively or additionally, the steps of blocks 101 and 103 may be performed as a single event where the thread is passed to the core along with an associated task identifier indicating whether or not an improved level of determinism is to be provided.

At block 105, a test is performed to ascertain whether or not, based on the received task identifier, an improved level of determinism is to be provided for the task, that is whether a deterministic execution of the code within the core pipeline is required, thus removing the effect of the core's capability to utilize extra resources of the core to complete the same task but with a wider variation in execution time than when not using an SMT core and its dual issuing capabilities. For example, when the schedule for a task is tight and a completion deadline for the task must be met, a user could opt to require an increased level of determinism to deliver an instruction flow without variation in the execution time. In response to a task identifier being received that is indicative of a task for which an improved level of determinism is to be provided, the operational sequence advances to block 107 where a dual-issue capability of at least one of the first thread or the second thread is temporarily disabled. This temporary disablement may last for a predetermined, predefined, or specified duration of time or task, and may be regarded as providing a task-triggered deterministic operational mode. Illustratively, the temporary disablement or suspension of dual issuing is performed until the task associated with the need for the improved level of determinism is completed. Alternatively or additionally, the duration of time may, but need not, be defined in terms of N clock cycles, where N is a positive integer that is greater than three. Alternatively or additionally, the duration of time may, but need not, be defined using an N-bit saturating counter to accumulate a count indicative of how many consecutive instruction issue slots are not filled with an instruction from at least one of the first thread or the second thread. Illustratively, the predetermined, predefined, or specified duration of time expires when the N-bit saturating counter saturates.

Alternatively or additionally, the temporary disablement or suspension of dual issuing for a specific period of time or number of clock cycles may be performed through the use of a counter. Pursuant to a set of illustrative embodiments, a need may arise for tasks to be appropriately structured such that a high priority/deterministic task is not so lengthy that it penalizes the overall performance of the processor. In such cases, a clock cycle counter, or a timeout could be implemented rather than total task execution.

The negative branch from block 105 leads to block 109 where the dual-issue capability of the first thread and the dual-issue capability of the second thread both remain intact. In most instances, the determinism will start and end with the tagging of the thread. While the thread remains tagged for deterministic execution, the appropriate issuing policy will remain applied. The provision of a critical performance override, or watchdog which times out after an allowable time to guard against permanently inhibiting dual issues, may also be implemented.

Figure 2:
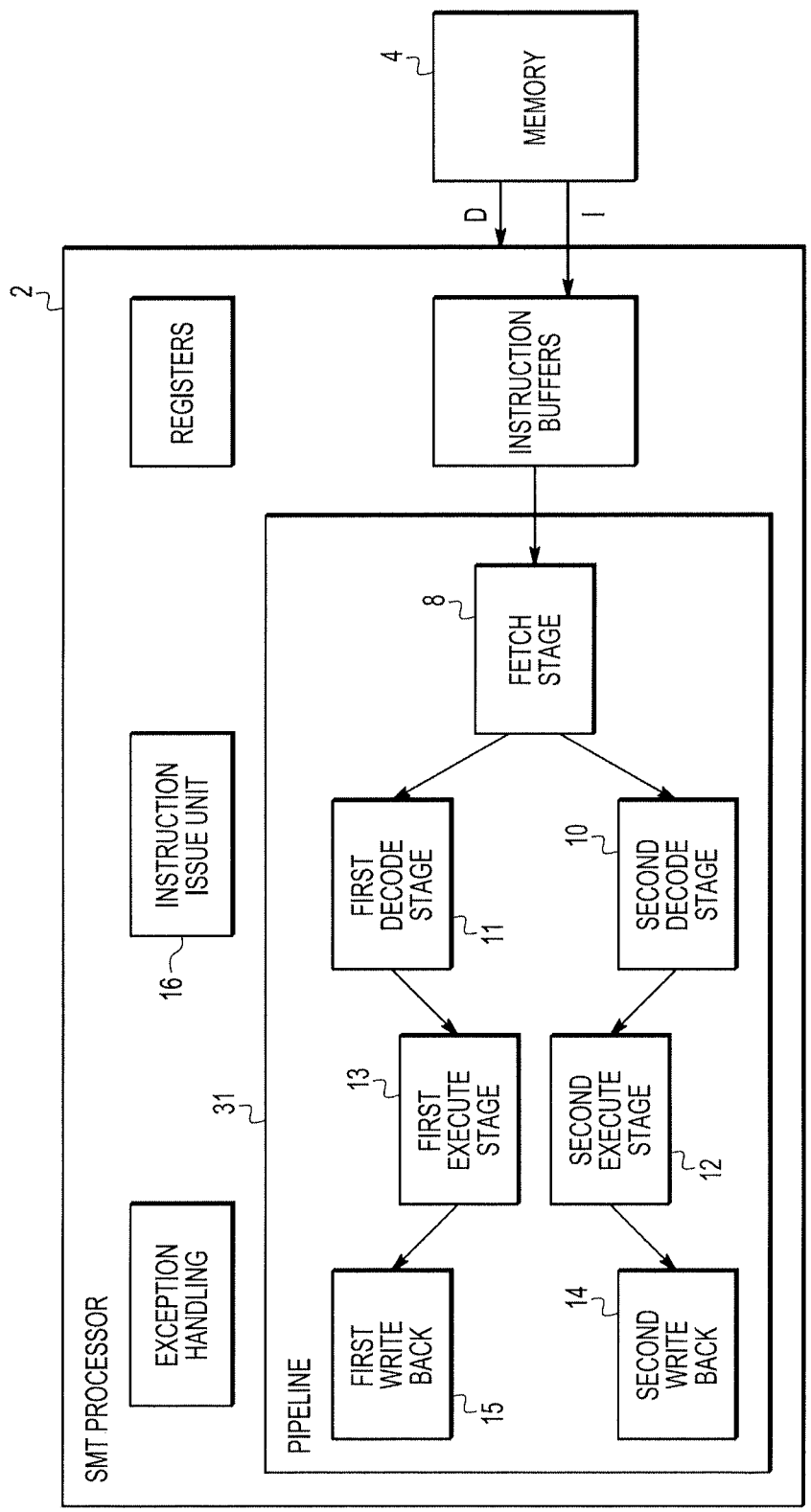
FIG. 2 is a hardware block diagram showing an exemplary simultaneous multi-threaded superscalar processor for providing the task-triggered deterministic operational mode according to a set of exemplary embodiments.

FIG. 2 is a hardware block diagram showing an exemplary simultaneous multi-threaded superscalar (SMT) processor 2 for providing the task-triggered deterministic operational mode according to a set of exemplary embodiments. In embodiments, the SMT processor can be utilized, for example, to control vehicular electronics such as automotive powertrain electronics, anti-braking systems (ABS), navigation systems, and other control systems. The SMT processor 2 is connected to a memory 4. The memory 4 stores data and instructions which are supplied to the SMT processor 2. The memory 4 may, but need not, store a lookup table that associates each of a plurality of respective tasks with a corresponding level of determinism required for the task. The SMT processor 2 includes an instruction pipeline 31. The instruction pipeline 31 includes a fetch stage 8, a first decode stage 10, a second decode stage 11, a first execute stage 12, a second execute stage 13, a first write back stage 14, a second write back stage 15, and an instruction issue unit 16. The SMT processor 2 may, but need not, include other optional aspects related to a core, such as an exception handing and register map.

The instruction pipeline 31 may implement duplication of one or more of the stages described previously, such as the first and second decode stages 10, 11, the first and second execute stages 12, 13, and the first and second write back stage 14, 15, to enable improved throughput, and to support the execution of multiple, potentially independent, instruction threads at one time. The instruction pipeline 31 may implement multiple execution units (first and second execute stages 12, 13) which can be shared between the threads, enabling dual issuing from any one thread if resources are available.

Instructions to be executed, and drawn from a plurality of program threads, are fetched from the memory 4 by the fetch stage 8. After decoding in one or both of the first and second decode stage 10, 11, the instruction issue unit 16 queues the instructions from the plurality of program threads and issues these instructions into available issue slots associated with the first and second execution units 12, 13. When both the first and second decode stages 10, 11 are utilized, it is generally for use on different instructions, as typically one instruction would not use both decide stages. On completion, the instructions are retired in one or both of the first and second write back stages 14, 15. In this example, the SMT processor 2 is capable of executing up to two program instructions in parallel, and thus the SMT processor 2 is considered to be a dual-issue processor. The instruction issue unit 16 may issue zero, one or two program instructions during each issue cycle. Accordingly, the set of program instructions being issued in parallel may comprise zero, one or two program instructions. For example, in an embodiment, a tag could be enabled at the start and disabled at the end to the instructions to be executed deterministically. Control structures in the CPU pipeline would inhibit dual issuing from the thread on which the instructions were executing when the tag was read as active. Dual issuing would then be re-enabled at the end of the instructions which were to be deterministic when the tag was de-activated, or the number of defined cycles had been executed or a counter, used to manage the duration of the deterministic operation, has expired.

Figure 3:
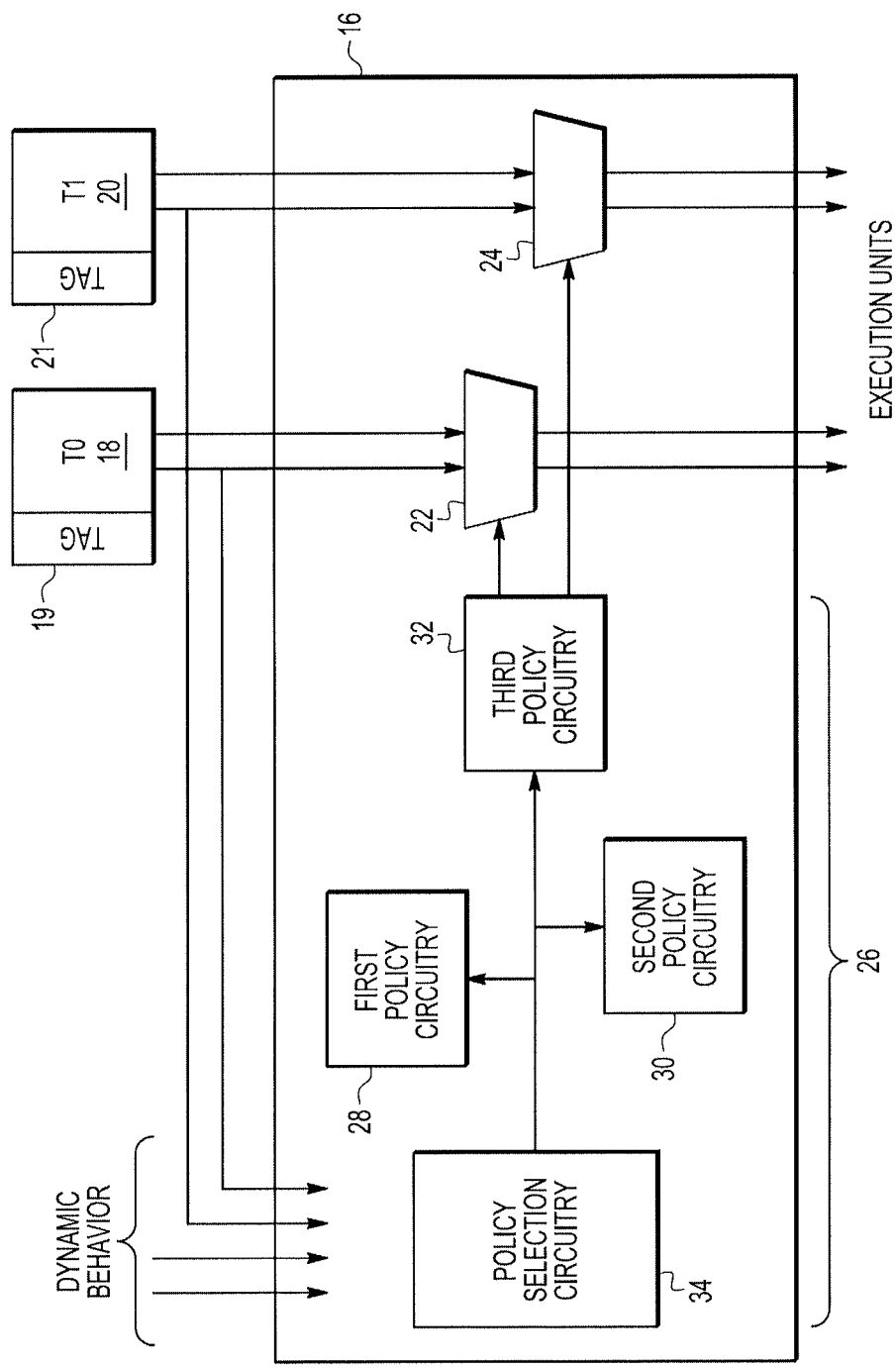
FIG. 3 is a hardware block diagram illustrating exemplary instruction issue circuitry and issue policy selection circuitry within the issue stage of FIG. 2 for providing the task-triggered deterministic operational mode according to a set of exemplary embodiments.

FIG. 3 is a hardware block diagram illustrating exemplary instruction issue control circuitry 26 and exemplary issue policy selection circuitry 34 within the issue stage 16 of FIG.

2 for providing the task-triggered deterministic operational mode according to a set of exemplary embodiments. The issue stage 16 (FIG. 3) includes an instruction queue 18 for a first thread T0, and an instruction queue 20 for a second thread T1. Thus, each of the respective instruction queues 18, 20 stores instructions from a corresponding program thread T0 or T1. Either of these threads T0 or T1 are capable of dual issuing, but with the core only able to sustain a total of two issues in a single cycle, the maximum which can be supported is either T0 dual issuing and T1 zero issuing, T0 zero issuing and T1 dual issuing, or T0 single issuing and T1 single issuing.

Each of respective program threads T0 and T1 maintains a corresponding tag 19, 21, where each of the tags 19, 21 functions as the identifier described in block 103 (FIG. 1), and dynamically identifies whether or not the instruction to be issued requires determinism in the pipeline. The tags 19, 21 are used by the issue control circuitry 26 to manage the instruction issuing independently for the threads T0 and T1. A first issue controller 22 and a second issue controller 24 apply the issue policy to the first and second threads from the queues 18, 20 to issue in their associated issue slot. The selecting signals supplied to the first and second issue controllers 22, 24 are generated within the issue control circuitry 26. This issue control circuit 26 includes hardware blocks for a first policy circuitry 28 element, a second policy circuitry 30 element, and a third policy circuitry 32 element. Each of the respective policy circuitry 28, 30, and 32 elements are configured for implementing a corresponding associated issue policy. Thus, each of the respective policy circuitry 28, 30, 32 elements operate in accordance with a corresponding operational sequence, an example of which was previously described in the context of FIG. 1.

Although FIG. 3 shows three policy circuitry 28, 30, 32 elements, this is for illustrative purposes, as any number of one or more policy circuitry elements may be utilized. For example, in the context of the operational sequence of FIG. 1, the hardware configuration of FIG. 3 may only employ the first policy circuitry 28 element and the second policy circuitry 30 element. The first policy circuitry 28 element may be used to temporarily disable the dual-issue capability of the first thread or the second thread in response to the task requiring determinism (FIG. 1, blocks 105 and 107). The second policy circuitry 30 (FIG. 3) element may then be used to re-enable the dual-issue capability of the first thread or the second thread after the dual-issue capability of the first thread or the second thread has been disabled. Alternatively or additionally, the first policy circuitry 28 element may be employed to temporarily disable and then re-enable the dual-issue capability of the first thread or the second thread.

The issue policy selection circuitry 34 is responsive to a detected dynamic behavior of the processor 2 to generate signals for selecting one of the first policy circuitry element 28, the second policy circuitry element 30, or the third policy circuitry element 32 elements to be active, and to control the issue controllers 22, 24 in accordance with the issue policy that is associated with the selected policy circuitry element 28, 30, or 32. The individual issue policies themselves can provide for selecting and deselecting the task-triggered deterministic operational mode. The ability to cope with a wide variety of different circumstances using such policies is achieved by the issue policy selection circuitry 34 which is responsive to the detected dynamic behavior to select as a selected issue policy which is active at a given time from among the different policies provided by the policy circuitry elements 28, 30, 32.

Overall, it will be seen from the foregoing discussion that the issue stage 16 (FIGS. 2 and 3) is capable of operating in accordance with a plurality of different issue policies. Each of those issue policies may themselves be relatively simple and accordingly efficiently provided by appropriate hardware. A selection between which of the policies is to be active at any given time is made by policy selection circuitry 34 in a dynamic manner and in dependence upon the detected behavior (e.g. real issue outcomes; speculative issue outcomes (e.g. what was possible rather than what actually took place); and/or other behavior). This permits the selected issue policy to be changed to cope with a wide variety of different circumstances which may arise whilst not unduly burdening this system with a single complex issue policy attempting to cope with all of the different types of situations which may arise.

Although the foregoing discussion describes exemplary embodiments of apparatuses and related methods of operation associated therewith, the present disclosure is intended to encompass numerous other embodiments as well. It should also be appreciated that the many apparatuses, systems, circuits, and methods of operation described above in detail or otherwise encompassed by the present disclosure can be implemented in numerous contexts, in integrated circuits or other circuits or components or systems. For example, in at least some embodiments, the apparatuses, systems, circuits, and methods of operation described herein or otherwise encompassed herein can be used in networking systems, automotive applications, and other applications.

While the principles of the invention have been described above in connection with specific apparatuses, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A method comprising:
   executing a first thread and a second thread, wherein the first thread and the second thread are simultaneously executed on a simultaneous multi-threaded superscalar processor, wherein the first thread is provided with a dual-issue capability such that up to two instructions of the first thread are issued in parallel, and wherein the second thread is provided with a dual-issue capability such that up to two instructions of the second thread are issued in parallel;
   retrieving a task identifier of a task from a lookup table, wherein the task is scheduled for execution by a selected thread that is one of the first and second threads, wherein the task identifier is associated with a level of determinism required by the task;
   in response to determining that the task requires an increased level of determinism, activating a tag associated with the selected thread;
   in response to the tag being read as active, disabling the dual-issue capability of the selected thread; and
   re-enabling the disabled dual-issue capability upon the tag being deactivated.

2. The method of claim 1, further comprising: deactivating the tag upon completion of the task.

3. The method of claim 1, further comprising: deactivating the tag upon expiration of a duration of time that is defined using an N-bit saturating counter, and wherein the N-bit saturating counter is configured to accumulate a count indicative of how many consecutive instruction issue slots are not filled with an instruction from at least one of the first thread or the second thread.

4. The method of claim 3, wherein the duration of time expires when the N-bit saturating counter saturates.

5. The method of claim 1, further comprising: operating a watchdog that is configured to time out after an allowable time so as to prevent a permanent inhibition of the dual-issue capability.

6. The method of claim 1, further comprising: applying at least one issue policy to instruction queues of the first and second threads.

7. The method of claim 1, further comprising: deactivating the tag upon expiration of a duration of time of at least N clock cycles, N being a positive integer greater than three.

8. The method of claim 1, wherein
the first and second threads with enabled dual-issue capability are configured to complete the task within a maximum execution time equal to a predetermined time plus a variation time, and
the increased level of determinism indicates that the task is required to complete within the predetermined time without the variation time.

9. The method of claim 1, further comprising:
in response to the dual-issue capability being disabled, issuing at least one instruction of the selected thread on a single issue basis.

10. An apparatus comprising:
a processor configured to execute a first thread and a second thread, wherein the first thread is provided with a dual-issue capability such that up to two instructions of the first thread are issued in parallel, and wherein the second thread is provided with a dual-issue capability such that up to two instructions of the second thread are issued in parallel; and
a memory operatively coupled to the processor, the memory configured to store instructions and a task identifier lookup table;
wherein the processor is further configured to:
retrieve a task identifier of a task from the task identifier lookup table, wherein the task is scheduled for execution by a selected thread that is one of the first and second threads, and wherein the task identifier is associated with a level of determinism required by the task;
in response to a determination that the task requires an increased level of determinism, activate a tag associated with the selected thread;
in response to the tag being read as active, disable the dual-issue capability of the selected thread; and
re-enable the disabled dual-issue capability upon the tag being deactivated; and
wherein the processor comprises a simultaneous multi-threaded superscalar processor.

11. The apparatus of claim 10, wherein the processor is further configured to deactivate the tag upon completion of the task.

12. The apparatus of claim 10, further comprising an N-bit saturating counter operatively coupled to the processor, wherein the processor is further configured to deactivate the tag upon expiration of a duration of time that is defined using the N-bit saturating counter, and wherein the N-bit saturating counter is configured to accumulate a count indicative of how many consecutive instruction issue slots are not filled with an instruction from at least one of the first thread or the second thread.

13. The apparatus of claim 12, wherein the duration of time expires when the N-bit saturating counter saturates.

14. The apparatus of claim 10, wherein the apparatus is provided in the form of one or more integrated circuits.

15. The apparatus of claim 10, further comprising a watchdog that is configured to time out after an allowable time so as to prevent a permanent inhibition of the dual-issue capability.

16. The apparatus of claim 10, further comprising first and second issue controllers configured to apply at least one issue policy to instruction queues of the first and second threads.

17. The apparatus of claim 10, wherein the processor is further configured to deactivate the tag upon expiration of a duration of time of at least N clock cycles, N being a positive integer greater than three.

18. A non-transitory computer readable memory encoded with a computer program comprising computer readable instructions recorded thereon for execution of a method that includes:
executing a first thread and a second thread on a simultaneous multi-threaded superscalar processor, wherein the first thread is provided with a dual-issue capability such that up to two instructions of the first thread are issued in parallel, and wherein the second thread is provided with a dual-issue capability such that up to two instructions of the second thread are issued in parallel;
retrieving a task identifier of a task from a lookup table, wherein the task is scheduled for execution by a selected thread that is one of the first and second threads, wherein the task identifier is associated with a level of determinism required by the task;
in response to determining that the task requires an increased level of determinism, activating a tag associated with the selected thread;
in response to the tag being read as active, temporarily disabling the dual-issue capability of the selected thread; and
re-enabling the disabled dual-issue capability upon the tag being deactivated.

19. The non-transitory computer readable memory of claim 18, wherein the method further comprises: deactivating the tag upon completion of the task.

20. The non-transitory computer readable memory of claim 18, wherein the method further comprises: deactivating the tag upon expiration of a duration of time that is defined using an N-bit saturating counter, wherein the N-bit saturating counter is configured to accumulate a count indicative of how many consecutive instruction issue slots are not filled with an instruction from at least one of the first thread or the second thread.

21. The non-transitory computer readable memory of claim 20, further including instructions wherein the duration of time expires when the N-bit saturating counter saturates.

22. The non-transitory computer readable memory of claim 18, wherein the method further comprises: deactivating the tag upon expiration of a duration of time of at least N clock cycles, N being a positive integer greater than three.

* * * * *